United States Patent [19]

Cesar et al.

[11] Patent Number: 4,476,908
[45] Date of Patent: Oct. 16, 1984

[54] REINFORCEMENT FOR TIRES PRODUCED BY MOLDING

[75] Inventors: Jean P. Cesar, Sayat; Jacques Gouttebessis, La Mouteyre; Andre Schneider, St-Hyppolyte, all of France

[73] Assignee: Companie Generale des Etablissements Michelin, Clermont-Ferrand, France

[21] Appl. No.: 521,712

[22] Filed: Aug. 9, 1983

Related U.S. Application Data

[63] Continuation-in-part of Ser. No. 275,363, Jun. 19, 1981, abandoned.

[30] Foreign Application Priority Data

Jun. 24, 1980 [FR] France ................... 80 14060

[51] Int. Cl.³ ............................................. B60C 9/00
[52] U.S. Cl. ............................. 152/357 A; 152/165
[58] Field of Search ............... 152/357 A, 35 X, 155, 152/165, 157, 362 R; 764/306, 328.3, 271.1, 275, 277, 270.1; 156/125, 131

[56] References Cited

U.S. PATENT DOCUMENTS

| | | | |
|---|---|---|---|
| 2,757,701 | 8/1956 | Henson | 152/357 A |
| 2,873,790 | 2/1959 | Codwell et al. | 156/125 |
| 3,208,500 | 9/1965 | Knipp et al. | 152/330 R |
| 3,240,250 | 3/1966 | Frazier | 152/35 X |
| 3,381,736 | 5/1968 | Ford et al. | 152/357 A |
| 3,458,373 | 7/1969 | Knipp et al. | 156/125 |
| 4,277,295 | 7/1981 | Schmidt et al. | 156/125 |

*Primary Examiner*—Michael Ball
*Attorney, Agent, or Firm*—Brumbaugh, Graves, Donohue & Raymond

[57] ABSTRACT

A tire produced from at least one liquid or paste material which solidifies in a tire mold to form the elastomeric material of the tire, consisting of a crown with two shoulders each connected to a sidewall terminating in a bead containing at least one bead ring, is characterized by the fact that it comprises a number of successive discrete radial hoops which are equally spaced apart in the longitudinal direction of the tire, are identical, consist at least in part of a moldable material, are embedded in the elastomeric material of the tire, are continuous from one bead to the other and are provided at each of their ends with a hook within which the bead ring is arranged, the hook being provided with at least one extension which extends up to a wall of the tire, and by the fact that the hoops, which are manufactured flat, are bent or curved by bringing the bead rings towards each other in the axial direction in order to impose upon the hoops a meridian trajectory corresponding substantially to the meridian curvature of the core of the tire mold, each normal section of each hoop at any given point (N) on the imposed meridian trajectory has a moment of inertia of flexure satisfying the law $$I_n = S \times Y_n \times \rho_n$$

$I_n$ being the moment of inertia of flexure of the normal section of each hoop at the given point (N) on the imposed meridian trajectory in the tire mold, S being a constant coefficient equal to the ratio of the axial bending force (P) applied to each flat hoop to the modulus of elasticity (E) of the material forming the hoop, $Y_n$ being the radial distance from the given point (N) on the imposed meridian trajectory to the median axis of the flat hoop, $\rho_n$ being the radius of local curvature at the given point (N) on the imposed meridian trajectory.

11 Claims, 3 Drawing Figures

REINFORCEMENT FOR TIRES PRODUCED BY MOLDING

This application is a continuation-in-part application of U.S. application Ser. No. 275,363, filed June 19, 1981 now abandoned.

The present invention relates to improvements in tires inflated to a pressure greater than atmospheric pressure, which tires are produced from at least one liquid or paste material which solidifies in a mold to form the elastomeric material of the tire and participates in the resistance of the tire when inflated and in use when the elastomeric material has sufficient mechanical properties.

In order to manufacture these tires, the mold is filled with the liquid or paste material. The mold consists essentially of one or more rigid shells intended to mold the outer wall of the tire and of a rigid or deformable core intended to mold the inner wall of the tire.

When it is desired to provide these tires with a reinforcement, this reinforcement is placed in the mold before the mold is filled. It is difficult to position the reinforcement with the necessary precision in the mold and to retain this arrangement during the filling, and particularly to position and maintain the reinforcement at the desired distance from the inner wall of the tire, that is to say from the outer wall of the core of the mold.

It has already been proposed to arrange radial metallic bands in the walls of a noninflatable solid toroidal tire. The purpose is to stiffen suitably this tire so that it bears the load without excessive crushing (U.S. Pat. No. 3,208,500). Furthermore, it has been proposed to curve metallic bands in accordance with the meridian profile which it is desired to impart to the tire and then place them alongside of each other and connect them in the longitudinal direction so as to constitute a shell which reinforces and protects the tire (French Pat. No. 917,701). However, these solutions do not make it possible to manufacture viable tires.

The object of the present invention is to position suitably the bead rings by means of elements which are relatively simple and inexpensive to manufacture, while using these elements to position a possible crown reinforcement and constitute, as well as position, a possible radial carcass reinforcement, this positioning being effected preferably with respect to the core of the mold, that is to say with respect to the inner wall of the tire.

In accordance with the present invention, a tire produced from at least one liquid or paste material which solidifies in a tire mold to form the elastomeric material of the tire, consisting of a crown with two shoulders each connected to a sidewall terminating in a bead containing at least one bead ring, is characterized by the fact that it comprises a number of successive discrete radial hoops which are equally spaced apart in the longitudinal direction of the tire, are identical, consist at least in part of a moldable material, are embedded in the elastomeric material of the tire, are continuous from one bead to the other and are provided at each of their ends with a hook within which the bead ring is arranged, the hook being provided with at least one extension which extends up to a wall of the tire, and by the fact that the hoops, which are manufactured flat, are bent or curved by bringing the bead rings towards each other in the axial direction in order to impose upon the hoops a meridian trajectory corresponding substantially to the meridian curvature of the core of the tire mold, each normal section of each hoop at any given point (N) on the imposed meridian trajectory has a moment of inertia of flexure satisfying the law $$I_n = S \times Y_n \times \rho_n$$

$I_n$ being the moment of inertia of flexure of the normal section of each hoop at the given point (N) on the imposed meridian trajectory in the tire mold, S being a constant coefficient equal to the ratio of the axial bending force (P) applied to each flat hoop to the modulus of elasticity (E) of the material forming the hoop, $Y_n$ being the radial distance from the given point (N) on the imposed meridian trajectory to the median axis of the flat hoop, $\rho_n$ being the radius of local curvature at the given point (N) on the imposed meridian trajectory.

In order to maintain the radial hoops equally spaced apart in the longitudinal direction, wedges are arranged on the bead ring between the hoops. These wedges are all of the same size, as are the hooks of the hoops. If it is desired to have as many hoops as possible, no wedge is provided between the hooks and the hooks are given as small a longitudinal dimension as possible.

In order to increase the reinforcing power of the hoops and form a conventional radial carcass reinforcement, each hoop has a reinforcement. This reinforcement may or may not extend within the hooks at the ends of the hoops which surround the bead ring. The reinforcement may consist of one or more wires or cables but also of fibers dispersed in the moldable material which forms the hoops.

The moldable material of the hoops is preferably identical to the elastomeric material of the tire or similar thereto or is reactive with respect to it.

In a first variant or embodiment, the radially inner surfaces of the hoops coincide, at least in the crown zone of the tire, with the inner wall of the tire.

This permits a rigorous positioning of the possible radial carcass reinforcement contained in the hoops with respect to the core of the mold.

In another variant, possibly in combination with an ordinary crown reinforcement, the hoops form a device for spacing the crown reinforcement with respect to the inner wall of the tire and/or comprise, in the zone of the shoulders, extensions, the axial spacing of which is suitable for the axially positioning of the crown reinforcement.

The preferred method of manufacturing the hoops consists in molding the hoops flat. This method makes it posssible to manufacture several hoops in a single mold and even to produce, with a single pouring, all of the hoops necessary for the production of at least one tire, these hoops being possibly firmly connected to each other at the level of the hooks, the portions between hooks being separated from each other. All the hoops, or the number of hoops necessary to produce a tire, are then hooked onto the bead rings by means of the hooks of the hoops. In this way a cylindrical blank is obtained, the hoops being in all cases flat, that is to say linear. When the two edges of the cylindrical blank containing the bead rings are brought towards each other in the axial direction one bends or curves the hoops, which are free to pivot around the bead rings due to their hooks, and one obtains a toroidal assembly ready to be placed in the tire mold. This toroidal assembly may also be produced by bringing the two edges of the cylindrical blank towards each other at the time of their introduction into the tire mold.

The preferred variant of the invention consists in using the bending or curving of the hoops which have been manufactured in flat form in order to impart an imposed meridian trajectory to the hoops. This by conferring upon the hoops normal sections (perpendicular to the hoops) with a variable moment of inertia of flexure between the hooks in accordance with the above law, namely, $$I_n = S \times Y_N \times \rho_n.$$

Identical hoops constructed in accordance with this preferred variant extend along the meridian trajectory determined by the evolution of the normal section of the hooks, since their terminal hooks are free to pivot around the bead rings at the time that the latter are brought axially towards each other. One can thus construct hoops which apply themselves without reaction onto the core of the tire mold or which remain parallel to the core of the tire mold, if one causes the evolution of the radius of meridian curvature of the core of the tire mold to reflect on the moment of inertia of flexure of the normal section of the hoops. Hoops in accordance with the invention which take into account the meridian profile of the tire can likewise be constructed.

Since the hoops are radial and since, at least in the region of the sidewalls, they follow a natural radial carcass equilibrium profile, the tension exerted by the inflation pressure on the hoops is practically constant in the sidewalls. If it is desired to construct hoops in which the tensile stress is constant and which follow a given meridian profile or trajectory in the sidewalls, it is sufficient to conceive hoops whose normal section has both a constant area at any point of the sidewalls and a moment of inertia of flexure which evolves as a function of the radius of local curvature of the meridian profile.

In the zones of the tire which upon travel are subjected to extensive flexure, it is thus of interest to make the hoops flexible by decreasing the moment of inertia of flexure, that is to say the moments of inertia of flexure of the normal sections of the hoops, as compared with the moments of inertia of flexure evolved as a function of the radius of local curvature while maintaining the area of the normal sections constant.

On the other hand, if it is desired to reinforce the tire in certain zones, it is advantageous to increase the area of the normal section of the hoops, the moment of inertia of flexure moreover following the above law of evolution of the radius of local curvature.

For example, for a hoop having a rectangular section, the sides of which have the lengths a and b, the moment of inertia of flexure is $I = ab^3/12$. One can effect an evolution of the area of the section $a \times b$ and/or of the moment of inertia of flexure I, that is to say the dimensions a and b of the rectangular section of the hoops which is contained between the hooks.

The drawing and the portion of the specification which relate thereto illustrate embodiments of the invention.

Figure 1:
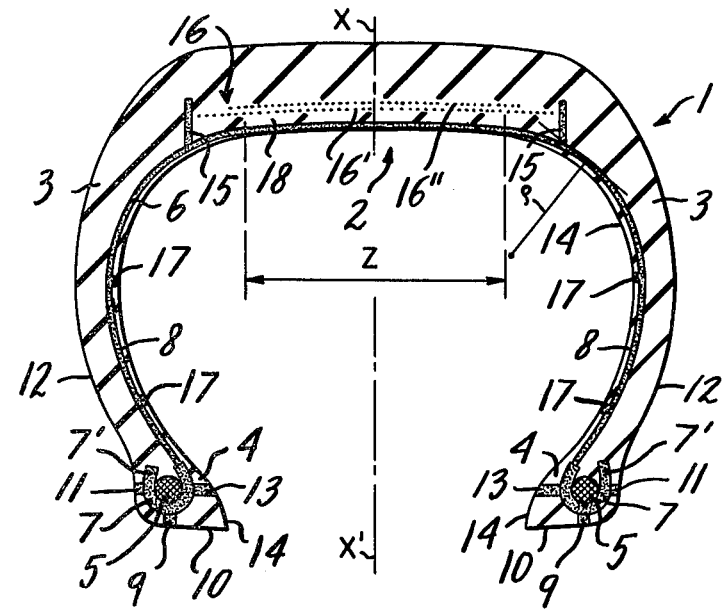
FIG. 1 is a radial section through a tire in accordance with the invention, along a hoop.

The tire 1 shown in cross section in FIG. 1 comprises a crown 2 connected to two sidewalls 3, each of which is terminated by a bead 4 provided with a bead ring 5. The radial hoop 6 embedded in the mass of elastomer of the tire is formed of a filiform portion 8 connecting one hook 7 to the other hook 7. The bead rings 5 rest within the hooks 7. The hooks 7 are provided with an extension 9 which extends through the base 10 of the bead 4. The point 7' of the hook 7, which in this example faces the outside of the tire, is provided axially outwards with an extension 11 which extends to the outer wall 12 of the tire. Axially towards the inside the hook 7 has another extension 13 which extends to the inner wall 14 of the tire. The hoop 6 (in its filiform portion 8) has other extensions 17 which extend up to the inner wall 14 of the tire (and/or the outer wall of the tire). Two extensions 15 are arranged symmetrically with respect to the equatorial plane, the trace of which on the plane of the drawing is the straight line XX', the extensions 15 being arranged in the vicinity of the shoulders and possibly extending to the surface of the tread. These extensions 15 serve advantageously for axially positioning the crown reinforcement 16.

The hoop 6 is tangent to the inner wall 14 of the tire 1 along an equatorial zone Z, along which zone the hoop 6 is flush with the inner wall 14 of the tire 1.

Figure 2:
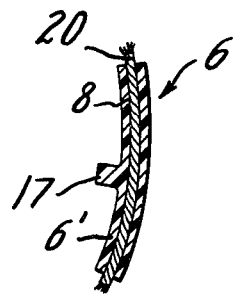
FIG. 2 is a view on a larger scale of a section of hoop and its reinforcement.

In the elastomeric mass 6' (FIG. 2) of the hoop 6 there is embedded a reinforcement 20 formed, for instance, of a cable extending from one hook 7 to the other. Thus, in the equatorial zone Z of the crown this reinforcement is spaced from the inner wall 14 of the tire. The crown reinforcement 16 is formed in this example of two plies 16', 16" consisting of cables which are parallel in each ply and crossed from one ply to the next, forming angles of less than 45° with the longitudinal direction of the tire. This crown reinforcement 16 is spaced from the inner wall 14 of the tire by hoops 6, possibly covered, as in this example, by a layer of elastomeric material 18.

Figure 3:
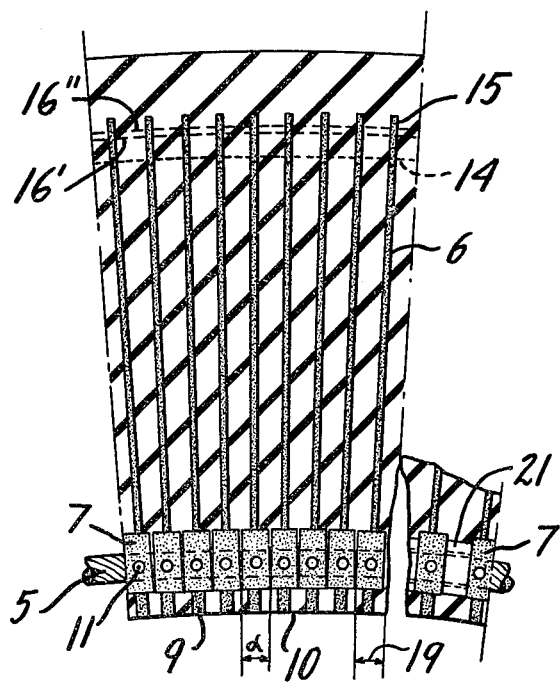
FIG. 3 shows the tire of FIG. 1, in axial view, with hoops with adjoining or nonadjoining hooks.

The hoops 6 of FIG. 3 have hooks 7 which adjoin each other in longitudinal direction. If L is the average length of the bead ring 5 and if # is the number of hoops 6, each hook 7 has a linear width or longitudinal dimension 19 equal to L/# or an angular width corresponding to an angle $\alpha$ centered on the axis of the tire such that $\alpha = 360°/\#$.

In FIG. 1 a radius of local curvature $\rho$ has been shown in the zone of a shoulder of the tire 1.

FIG. 3 in the lower right-hand part thereof, shows a variant embodiment of the invention in which a wedge 21 is interposed between two successive hooks 7. This arrangement makes it possible, for instance, to reduce the number of hoops 6 in the case of tires intended to bear a relatively small load. These wedges 21 may, as shown in the drawing, be without extensions such as those (9, 11, 13) of the hooks 7 of the hoops 6.

For manufacturing the hoops and the hooks as well as the wedges, preference should be given to injection-moldable materials. Such materials are for instance semicrystalline thermoplastic polymers (polyamides, saturated polyesters, polyolefins, polyacetals); amorphous thermoplastic polymers such as polycarbonates, polyphenylene-oxide-based mixtures, acrylonitrile-butadiene-styrene, or thermoplastic elastomers such as polyurethane, etherpolyester, or polyolefins; heat-hardenable or reactive polymers such as unsaturated polyesters, vinylesters, epoxides, polyurethanes.

The reinforcement which may be embedded in the elastomeric mass of the hoops can be a wire or cord of any material usually used for reinforcing pneumatic tires, e.g., natural, artificial or synthetic textiles, glass fibers, metal.

Liquid or pasty materials which can be used for making a tire according to the invention are for instance those derived by reaction of a polyester with a polyisocyanate, as described by Bayer et al in Rubber Chemistry and Technology, vol. 23, pp. 812–835(1950).

What is claimed is:

1. A tire produced from at least one liquid or paste material which solidifies in a tire mold to form the elastomeric material of the tire, consisting of a crown with two shoulders each connected to a sidewall terminating in a bead containing at least one bead ring, characterized by the fact that it comprises a number of successive discrete radial hoops which are equally spaced apart in the longitudinal direction of the tire, are identical, consist at least in part of a moldable material, are embedded in the elastomeric material of the tire, are continuous from one bead to the other and are provided at each of their ends with a hook within which the bead ring is arranged, the hook being provided with at least one extension which extends up to a wall of the tire, and by the fact that the hoops, which are manufactured flat, are bent or curved by bringing the bead rings towards each other in the axial direction in order to impose upon the hoops a meridian trajectory corresponding substantially to the meridian curvature of the core of the tire mold, each normal section of each hoop at any given point (N) on the imposed meridian trajectory has a moment of inertia of flexure satisfying the law $$I_n = S \times Y_n \times \rho_n$$

$I_n$ being the moment of inertia of flexure of the normal section of each hoop at the given point (N) on the imposed meridian trajectory of the tire mold, S being a constant coefficient equal to the ratio of the axial bending force (P) applied to each flat hoop to the modulus of elasticity (E) of the material forming the hoop, $Y_n$ being the radial distance from the given point (N) on the imposed meridian trajectory to the median axis of the flat hoop, $\rho_n$ being the radius of local curvature at the given point (N) on the imposed meridian trajectory.

2. A tire according to claim 1, characterized by the fact that wedges are arranged on the bead ring between the hoops, the hooks of the hoops having a longitudinal dimension which is identical from one hoop to the next.

3. A tire according to claim 1, characterized by the fact that the hooks of the hoops have a longitudinal dimension which is identical from one hoop to the next and is equal to the developed length of the bead ring divided by the number of hoops used.

4. A tire according to claim 1, characterized by the fact that each hoop has a reinforcement.

5. A tire according to claim 1, characterized by the fact that each hoop is provided with an extension which extends up to the inner wall and/or the outer wall of the tire.

6. A tire according to claim 1, characterized by the fact that the moldable material of the hoops is identical to the elastomeric material of the tire or similar thereto or reactive with respect to it.

7. A tire according to claim 1, characterized by the fact that the radially inner surfaces of the hoops coincide, at least in the crown zone of the tire, with the inner wall of the tire.

8. A tire according to claim 1 or 7 having a crown reinforcement, characterized by the fact that the hoops form a device for spacing the crown reinforcement with respect to the inner wall of the tire and/or comprise, in the zone of the shoulders, extensions, the axial spacing of which is suitable for the axial positioning of the crown reinforcement.

9. A tire according to claim 1, characterized by the fact that the normal section of the hoops has a constant area at any point of the sidewalls of the tire.

10. A tire according to claim 9, characterized by the fact that in the zones where the tire undergoes extensive flexure the moment of inertia of flexure of the normal sections of the hoops is decreased.

11. A tire according to claim 8, characterized by the fact that in the zones where the tire must be reinforced the area of the normal section of the hoops is increased.

* * * * *